United States Patent
Su et al.

(10) Patent No.: US 8,077,167 B2
(45) Date of Patent: Dec. 13, 2011

(54) LIQUID CRYSTAL DISPLAY AND DRIVING METHOD THEREOF

(75) Inventors: Ting-Wei Su, Hsinchu (TW); Jenn-Jia Su, Hsinchu (TW)

(73) Assignee: Au Optronics Corporation, Hsinchu (TW)

( * ) Notice: Subject to any disclaimer, the term of this patent is extended or adjusted under 35 U.S.C. 154(b) by 1160 days.

(21) Appl. No.: 11/836,150

(22) Filed: Aug. 9, 2007

(65) Prior Publication Data

US 2008/0266218 A1   Oct. 30, 2008

(30) Foreign Application Priority Data

Apr. 26, 2007   (TW) .............................. 96114736 A

(51) Int. Cl.
*G09G 5/00*   (2006.01)
(52) U.S. Cl. ...................................................... 345/204
(58) Field of Classification Search ............. 345/87–100
See application file for complete search history.

(56) References Cited

U.S. PATENT DOCUMENTS

| | | | | |
|---|---|---|---|---|
| 7,619,694 B2 * | 11/2009 | Lee et al. | .......................... | 349/38 |
| 2003/0227429 A1 * | 12/2003 | Shimoshikiryo | ................ | 345/90 |
| 2004/0001167 A1 | 1/2004 | Takeuchi et al. | | |
| 2004/0164942 A1 * | 8/2004 | Shih et al. | ........................ | 345/90 |
| 2005/0122441 A1 | 6/2005 | Shimoshikiryoh | | |
| 2005/0213015 A1 | 9/2005 | Shimoshikiryo | | |
| 2006/0097972 A1 | 5/2006 | Takeuchi et al. | | |
| 2006/0262237 A1 * | 11/2006 | Chen et al. | ....................... | 349/38 |

FOREIGN PATENT DOCUMENTS

| | | |
|---|---|---|
| JP | 2005-250085 | 9/2005 |
| JP | 2006126837 | 5/2006 |
| TW | 200641494 | 12/2006 |

OTHER PUBLICATIONS

"Office Action of Japan Counterpart Application", issued on Oct. 5, 2010, p1-p2, in which the listed reference was cited.

* cited by examiner

*Primary Examiner* — Richard Hjerpe
*Assistant Examiner* — Carolyn R Edwards
(74) *Attorney, Agent, or Firm* — Jianq Chyun IP Office

(57) ABSTRACT

An LCD panel including scan lines, data lines, first common lines, second common lines and pixels electrically connected to the scan lines and the data lines is provided. Each pixel has a first display region and a pair of second display regions when the pixels are driven. The first display region and the pair of the second display regions of each pixel are coupled by the first common lines and the second common lines, respectively so as to display different levels of brightness. Besides, the first display region and the second display regions of each pixel are aligned in a column direction, and the first display region of each pixel is disposed between the pair of the second display regions.

17 Claims, 10 Drawing Sheets

LIQUID CRYSTAL DISPLAY AND DRIVING METHOD THEREOF

CROSS-REFERENCE TO RELATED APPLICATION

This application claims the priority benefit of Taiwan application serial no. 96114736, filed Apr. 26, 2007. All disclosure of the Taiwan application is incorporated herein by reference.

BACKGROUND OF THE INVENTION

1. Field of the Invention

The present invention relates to a display apparatus, and more particularly to a liquid crystal display (LCD) panel and a driving method thereof.

2. Description of Related Art

To date, thin film transistor liquid crystal displays (TFT-LCDs) with high contrast ratio, no gray scale inversion, low color shift, high luminance, full color, high color saturation, high responsive speed, and wide viewing angles are required. At this current stage, some displays, such as twisted nematic (TN) liquid crystal displays having wide viewing films, in-plane switching (IPS) displays, fringe field switching (FFS) displays and multi-domain vertical alignment (MVA) displays, have been developed to achieve a purpose of wide viewing angle.

Due to the alignment protrusions or slits formed on a color filter substrate or a TFT array substrate, the conventional MVA LCD panels allow liquid crystal molecules to be arranged in multiple directions, thereby obtaining different alignment domains. As such, the MVA LCD panels are able to comply with the requirement for wide viewing angle.

FIG. 1A illustrates a relationship between a normalized transmittance of a conventional MVA LCD panel and a gray level thereof. Referring to FIG. 1A, the horizontal axis indicates the gray level, while the vertical axis represents the normalized transmittance. It is known from FIG. 1A that a curvature of a transmittance-gray level curve varies in different viewing angles even though the conventional MVA LCD panel is able to comply with the requirement of the wide viewing angle. In other words, as the viewing angle alters, the brightness displayed by the conventional MVA LCD panel may vary, leading to issues of color shift, color washout, and so on.

In order to resolve the issue of color shift, a plurality of conventional technologies has been proposed, and one of them is directed to forming two display regions with different luminance in a single pixel. Due to different data voltages inputted into the two display regions or different capacitances for coupling the data voltages of the two display regions, different electric fields are generated in the two display regions in the single pixel, and the liquid crystal molecules in the two display regions are then arranged in different tilt angles.

FIG. 1B is a schematic view illustrating a displaying state of a conventional MVA LCD panel. Referring to FIG. 1B, an LCD panel 10 is formed by a plurality of pixels 12 arranged in array, and each of the pixels 12 includes a bright display region B and a dark display region D. As shown in FIG. 1B, an arrangement of the bright display region B and that of the dark display region D in each of the pixels 12 are periodically changed in a row direction, while the arrangement of the bright display region B and that of the dark display region D in each of the pixels 12 remains unchanged in a column direction.

The luminance distribution as described above may improve the color shift. However, with an increasing size of the LCD panel, the size of the pixels and the pitch between the pixels are inclined to be recognized by human eyes, and images displayed by the LCD panel have saw-toothed edge resulted from the above-mentioned luminance distribution. Thereby, the display quality of the LCD panel may be deteriorated.

SUMMARY OF THE INVENTION

In view of the foregoing, the present invention is directed to an LCD panel having a better display quality.

The present invention is further directed to a driving method of an LCD panel. The driving method enables the LCD panel to have desired display performance.

As embodied and broadly described herein, an LCD panel including a plurality of scan lines, a plurality of data lines, a plurality of first common lines, a plurality of second common lines and a plurality of pixels electrically connected to the scan lines and the data lines is provided. Each pixel has a first display region and a pair of second display regions when the pixels are driven. The first display region and the pair of the second display regions of each pixel are coupled by the first common lines and the second common lines, respectively, so as to display different levels of brightness. Besides, the first display region and the second display regions of each pixel are aligned in a column direction, and the first display region of each pixel is disposed between the pair of the second display regions of each pixel.

As embodied and broadly described herein, the present invention further provides a driving method for driving the LCD panel. The driving method includes inputting data signals from each of the data lines to each of the pixels in different rows and providing a first alternating signal and a second alternating signal to the first common line and the second common line, respectively. Here, oscillation periods of the first and the second alternating signals are the same, while the first alternating signal and the second alternating signal have a 180-degree phase shift. As such, the first display region and the second display region of each of the pixels respectively are coupled by the first and the second common lines and display different levels of brightness.

Based on the above, each of the pixels in the LCD panel of the present invention is divided into two display regions. With different couplings of the different common lines, the two display regions in each of the pixels display different levels of brightness, and the issue of color shift is further improved. In addition, the arrangements and the areas of the two display regions in each of the pixels can be adjusted based on the design demands, such that the desired luminance distribution of the LCD panel can be accomplished. Moreover, according to the present invention, the driving method of the LCD panel is capable of adjusting the luminance distribution of the LCD panel to a greater extent, such that the display performance of the LCD panel can be more delicate.

In order to make the aforementioned and other objects, features and advantages of the present invention more comprehensible, several embodiments accompanied with figures are described in detail below.

DESCRIPTION OF EMBODIMENTS

Figure 1A:
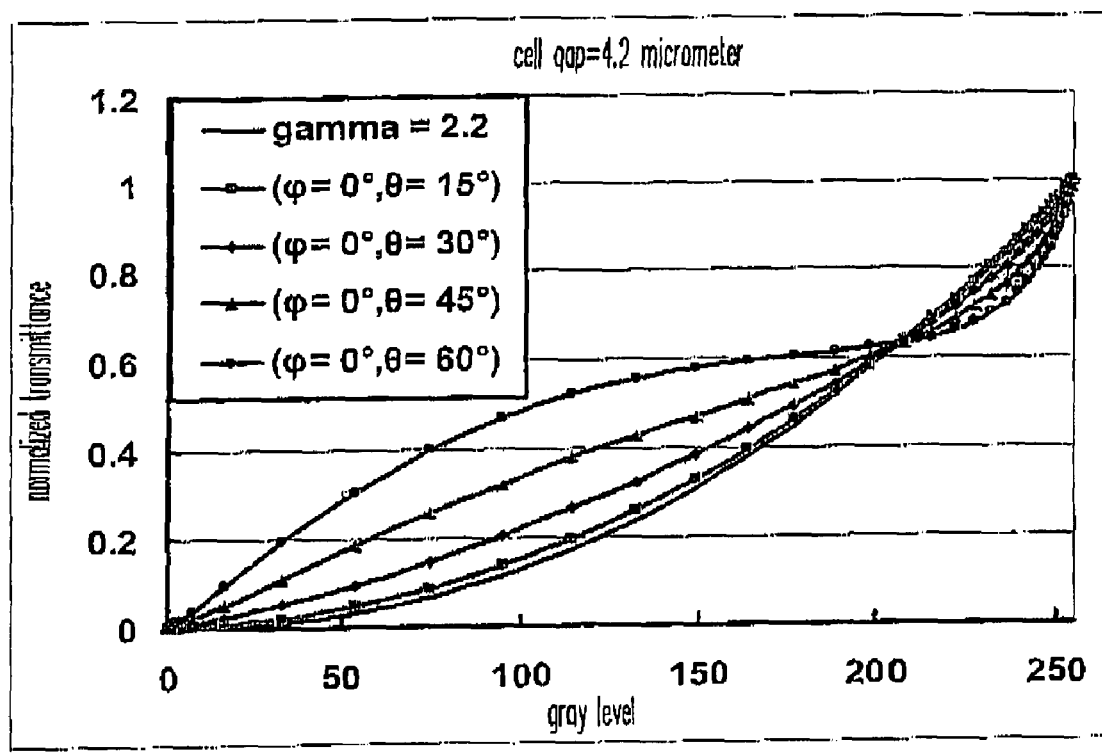
FIG. 1A illustrates a relationship between a normalized transmittance of a conventional MVA LCD panel and a gray level thereof.
Figure 1B:
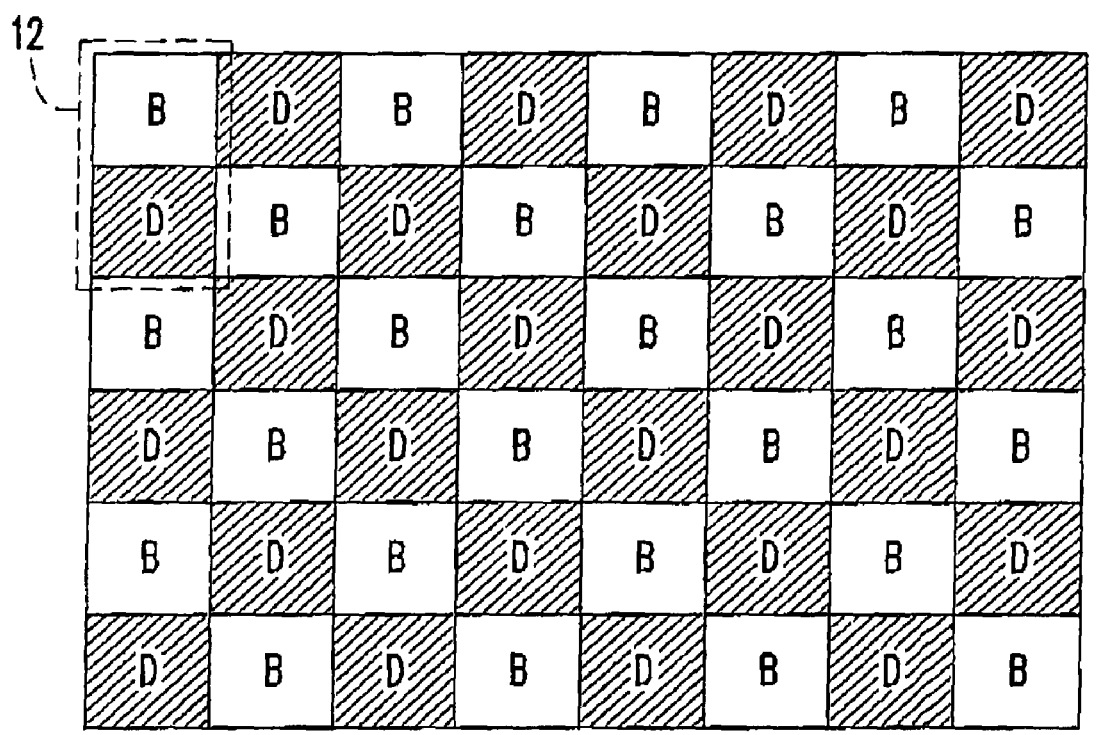
FIG. 1B is a schematic view illustrating a displaying state of a conventional LCD panel.
Figure 2:
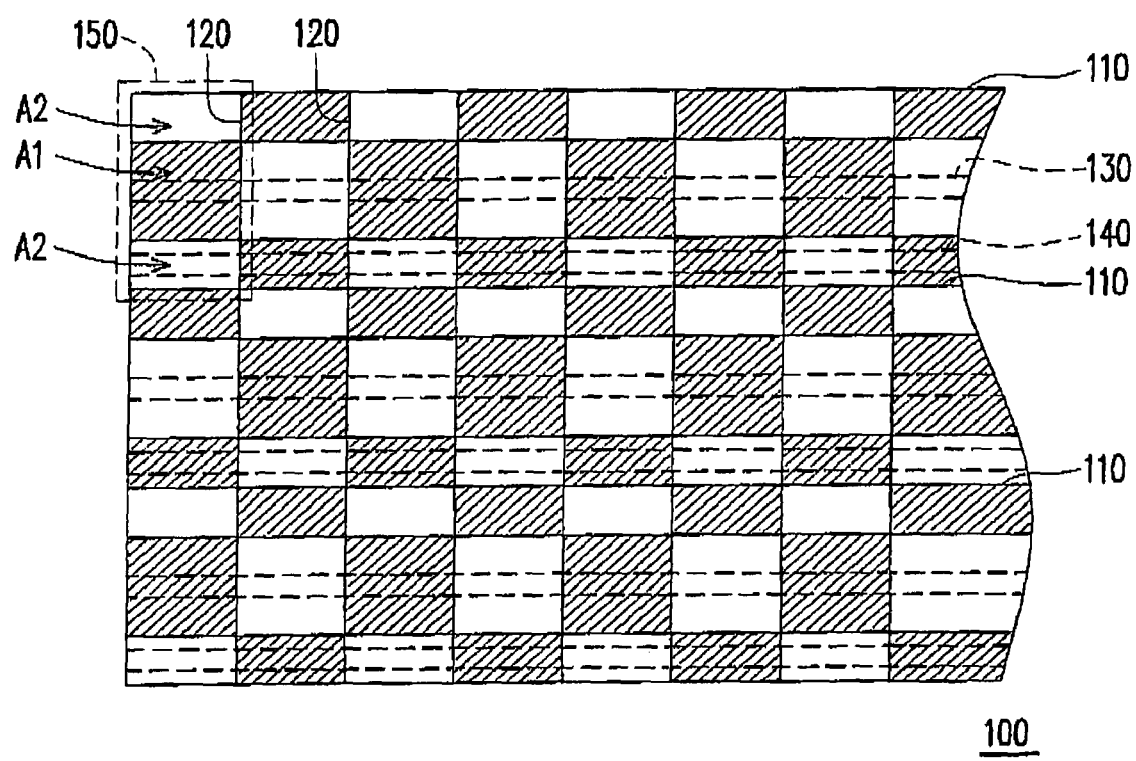
FIG. 2 is a schematic view illustrating a displaying state of an LCD panel according to the present invention.

FIG. 2 is a schematic view illustrating a displaying state of an LCD panel according to the present invention. Referring to FIG. 2, an LCD panel 100 includes a plurality of scan lines 110, a plurality of data lines 120, a plurality of first common lines 130, a plurality of second common lines 140 and a plurality of pixels 150 electrically connected to the scan lines 110 and the data lines 120. Each pixel 150 has a first display region A1 and a pair of second display regions A2 when the pixels 150 are driven. The first display region A1 and the pair of the second display regions A2 of each pixel 150 are coupled by the first common lines 130 and the second common lines 140, respectively, so as to display different levels of brightness. Besides, the first display region A1 and the second display regions A2 of each pixel 150 are aligned in a column direction, and the first display region A1 of each pixel 150 is disposed between the pair of the second display regions A2 of each pixel 150. For example, the first display region A1 and the pair of the second display regions A2 are rectangular.

Figure 3A:
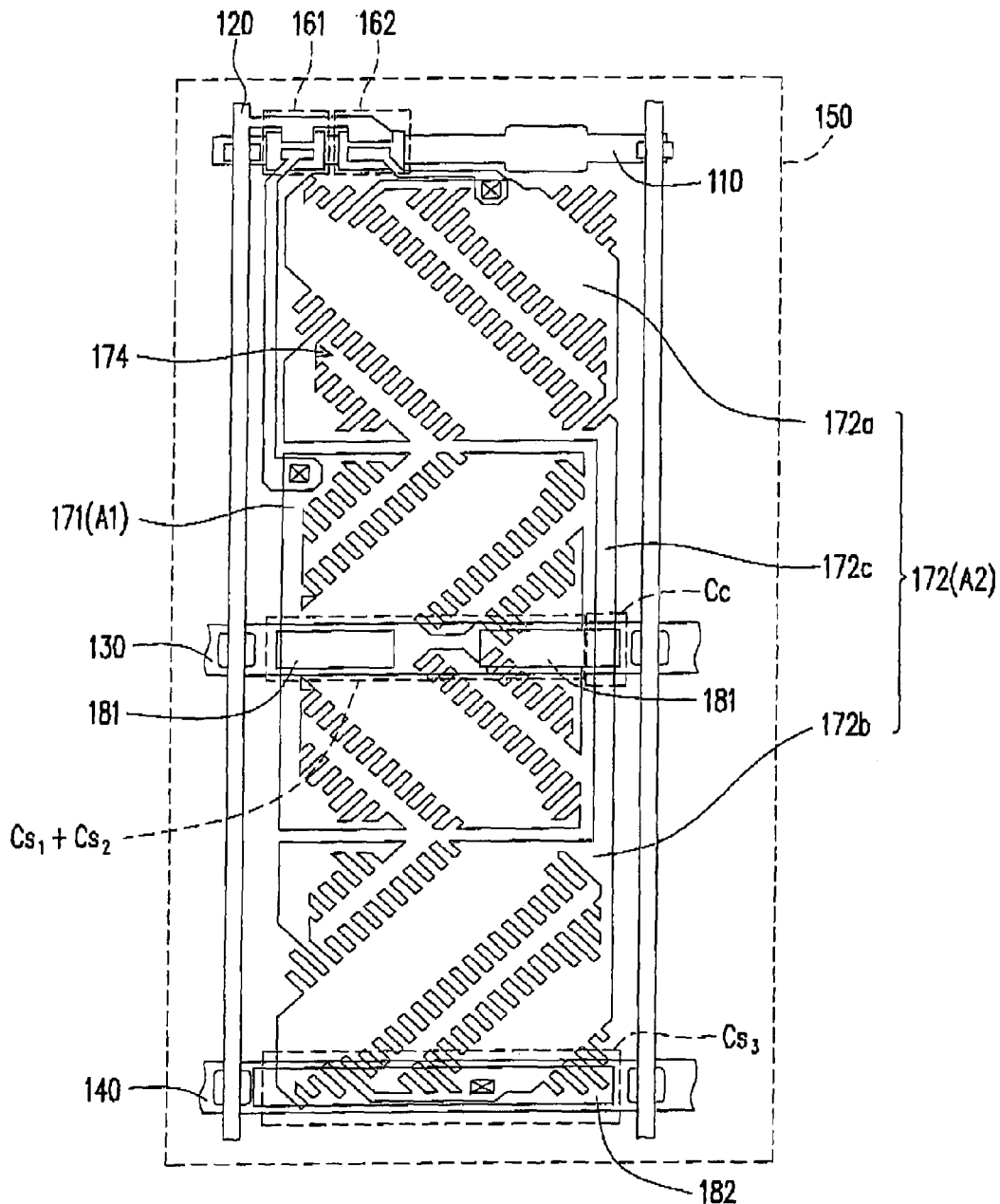
FIG. 3A is a schematic view illustrating an LCD panel according to the present invention.

FIG. 3A is a schematic view illustrating an LCD panel according to the present invention, and only one pixel 150 is depicted in FIG. 3A for demonstration. Referring to FIG. 3A, the pixel 150 includes a first active device 161, a second active device 162, a first pixel electrode 171 and a second pixel electrode 172. In the present embodiment, the first active device 161 and the second active device 162 of the pixel 150 are electrically connected to the same scan line 110 and the same data line 120. The first pixel electrode 171 is connected to the first active device 161, and the first pixel electrode 171 is located corresponding to the first display region A1 and is disposed over the first common line 130. The second pixel electrode 172 is connected to the second active device 162, and the second pixel electrode 172 is located corresponding to the second display regions A2 and is disposed over the second common line 140. In the present embodiment, the first pixel electrode 171 and the second pixel electrode 172 have a plurality of slits 174, such that liquid crystal molecules above the first pixel electrode 171 and the second pixel electrode 172 are arranged in a plurality of alignment domains.

The first pixel electrode 171 and the second pixel electrode 172 of the pixel 150 suffer different capacitance-coupling effects of the underlying first common line 130 and the second common line 140, respectively, such that the corresponding first display region A1 and the corresponding second display regions A2 display different levels of brightness.

Referring to FIG. 3A, the second pixel electrode 172 includes a first display electrode 172a, a second display electrode 172b and a connecting electrode 172c. The first display electrode 172a is electrically connected to the second active device 162. The first pixel electrode 171 is sandwiched between the first display electrode 172a and the second display electrode 172b. The second display electrode 172b is connected to the first display electrode 172a through the connecting electrode 172c.

Figure 3B:
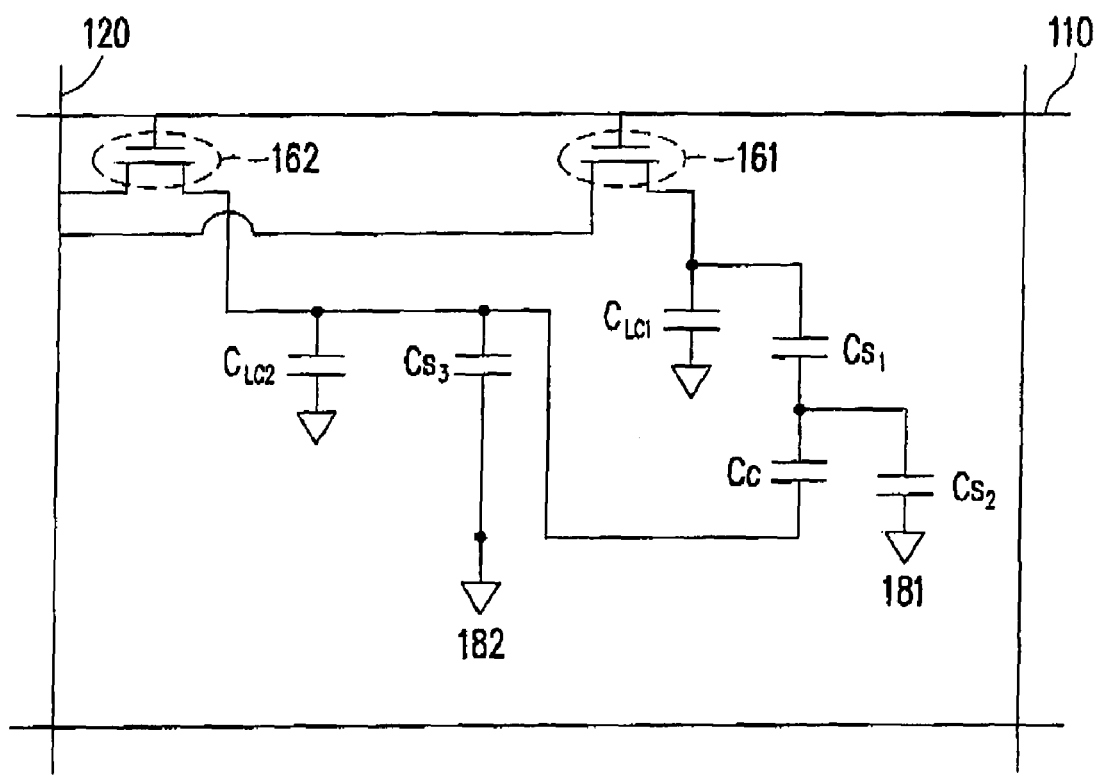
FIG. 3B is an equivalent circuit diagram of FIG. 3A.

To further improve the display quality of the LCD panel 100, the pixel 150 may further include a first capacitor electrode 181 and a second capacitor electrode 182 according to the present embodiment. The first capacitor electrode 181 is disposed between the first common line 130 and the first pixel electrode 171, and the second capacitor electrode 182 is disposed between the second common line 140, and the second pixel electrode 172. FIG. 3B is an equivalent circuit diagram of FIG. 3A. Referring to FIGS. 3A and 3B, a first storage capacitor $Cs_1$ is formed between the first common line 130 and the first capacitor electrode 181, a second storage capacitor $Cs_2$ is formed between the first capacitor electrode 181 and the first pixel electrode 171, and a third storage capacitor $Cs_3$ is formed between the second common line 140 and the second capacitor electrode 182. Besides, $C_{LC1}$ and $C_{LC2}$ are liquid crystal capacitors of the first pixel electrode 171 and the second pixel electrode 172, respectively. In the present embodiment, the first pixel electrode 171 and the second pixel electrode 172 may upgrade the display stability of each of the pixels 150 through the first storage capacitor $Cs_1$, the second storage capacitor $Cs_2$ and the third storage capacitor $Cs_3$.

Figure 4A:
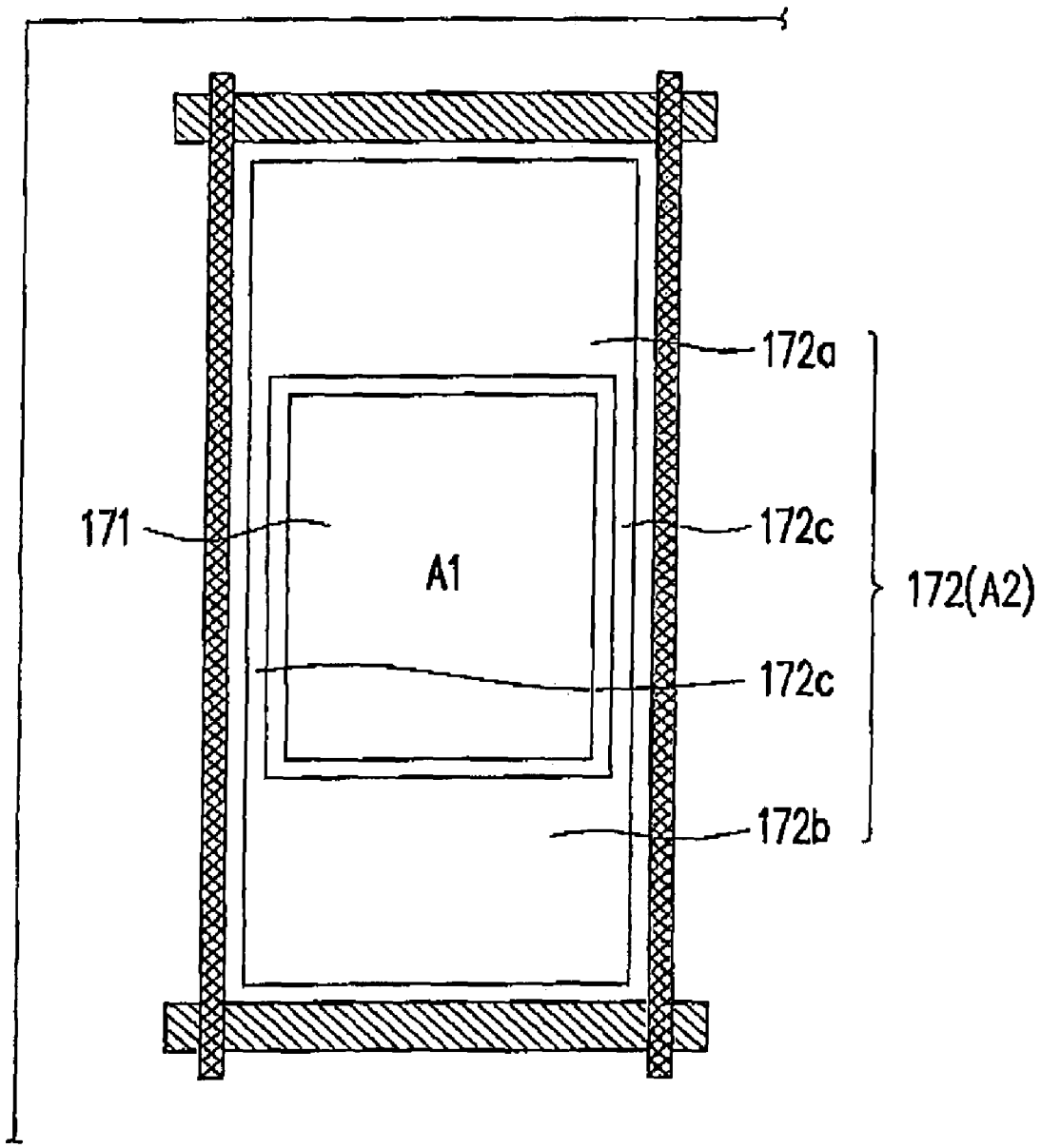
FIG. 4A is a schematic view illustrating another LCD panel according to the present invention.

Note that the first capacitor electrode 181 extends below a part of the connecting electrode 172c in the present embodiment, such that the first capacitor electrode 181 of each of the pixels 150 and the part of the connecting electrode 172 together form a coupling capacitor Cc. The second pixel electrode 172 is coupled to the first pixel electrode 171 through the coupling capacitor Cc, so as to maintain a specific relation between the brightness displayed by the first display region A1 and that displayed by the second display regions A2, and thereby undesired display quality can be further prevented. In particular, correlations between the first display region A1 and the second display regions A1 of the pixel 150 can be monitored by adjusting the capacitance of the coupling capacitor Cc. For example, in the present embodiment, the connecting electrode 172c in the pixel 150 is disposed at one side of the first pixel electrode 171. However, in other embodiments, the connecting electrode 172c may be disposed at respective sides of the first pixel electrode 171, as indicated in FIG. 4A.

Figure 4B:
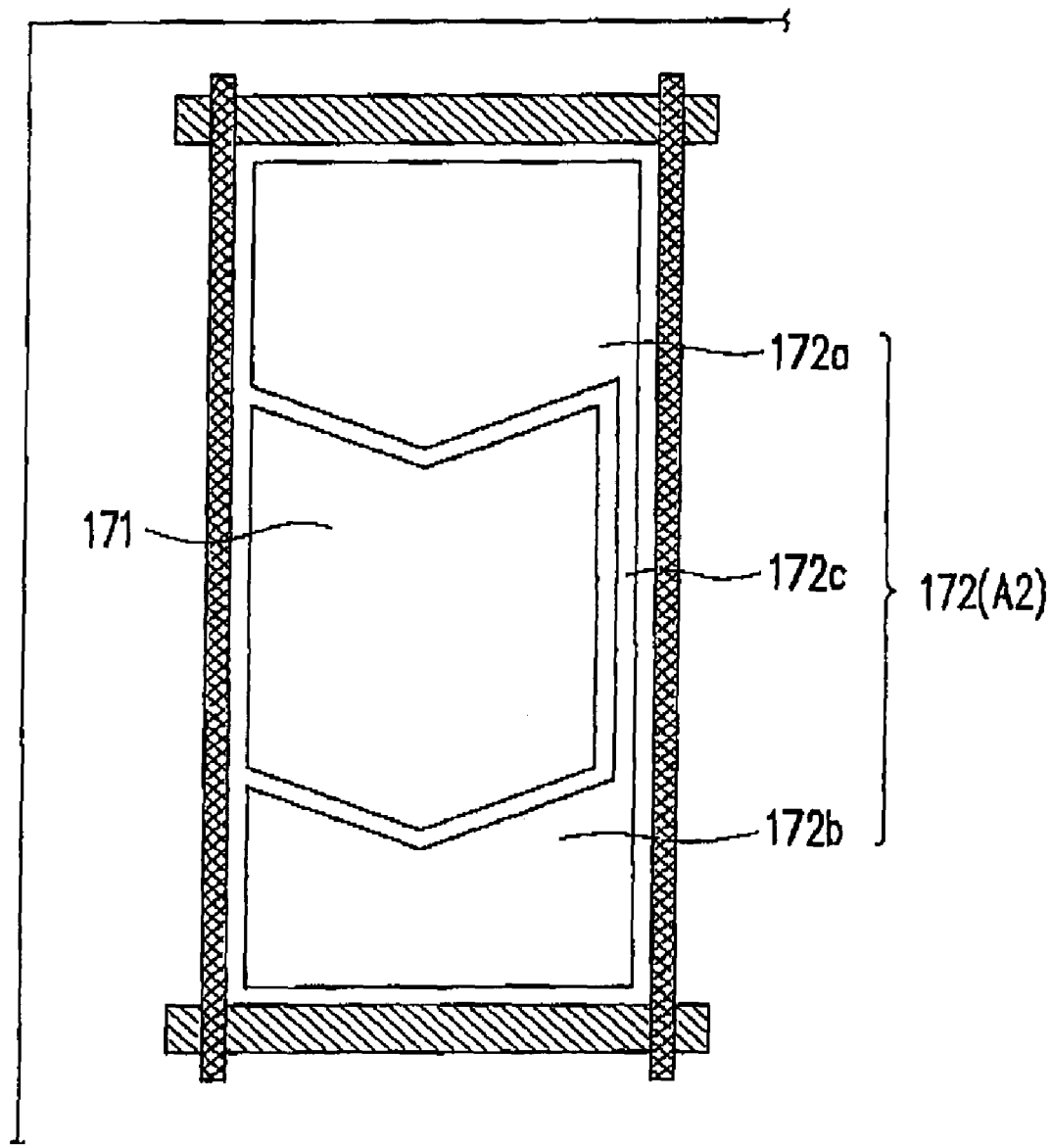
FIG. 4B is a schematic view illustrating still another LCD panel according to the present invention.

According to the present invention, the arrangement of the first display region A1 and the second display regions A2 in each of the pixels 150 can be changed through adjusting the shape or the area of the first pixel electrode 171, the first display electrode 172a and the second display electrode 172b in each of the pixels 150, such that the suppression of color shift can be optimized. For example, in FIGS. 3A and 4A, the area of the first display region A1 and the area of the second display regions A2 in each pixel 150 are substantially equal, and the first display region A1 of each of the pixels 150 is shaped as a rectangle. The second display regions A2 are correspondingly distributed to the respective sides of the first display region A1 based on the shape of the first display region A1. The shape of the first pixel electrode 171 can be properly revised based on actual the design demands, and the shapes of the adjacent first display electrode 172a and the second display electrode 172b may also be modified, such that the first display region A1 and the second display regions A2 of the pixel 150 can be arranged as a polygon, as shown in FIG. 4B. Accordingly, the areas, the shapes and the arrangements of the first pixel electrode 171 and the second pixel electrode 172 in each of the pixels 150 can be appropriately modulated based on the actual design demands and are not limited to those described in the present invention.

Figure 5:
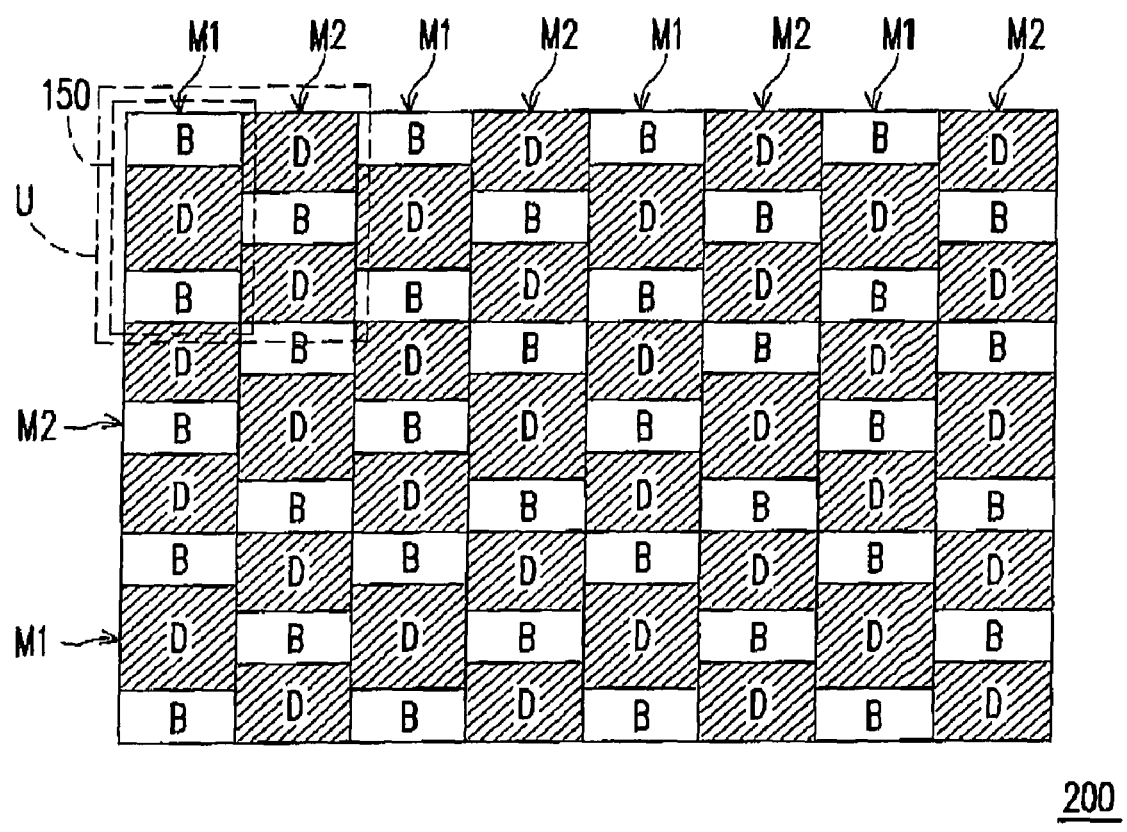
FIG. 5 is a schematic view illustrating a displaying state of another LCD panel according to the present invention.

It should be noted that each of the pixels 150 in the LCD panel of the present invention displays a plurality of luminance distributions, and the luminance distributions of the pixel 150 are periodically changed both in the row direction and in the column direction. In particular, the luminance distribution refers to an arrangement of the luminance conditions of the first display region A1 and the second display regions A2, and the areas thereof do not affect a determination on said luminance distributions. For example, as indicated in FIG. 5, a first luminance distribution M1 represents that the brightness level displayed by the first display region A1 in the pixel 150 is lower than that displayed by the second display regions A2, while a second luminance distribution M2 denotes that the brightness level displayed by the first display region A1 in the pixel 150 is higher than that displayed by the second display regions A2. That is to say, the first luminance distribution M1 shows that the dark display region D in the pixel 150 is disposed between two bright display regions B, while the second luminance distribution M2 indicates that the bright display region B is sandwiched between two dark display regions D.

FIG. 5 is a schematic view illustrating a displaying state of another LCD panel according to the present invention. Referring to FIG. 5, the pixels in the first row of the LDC panel 200 are sequentially and periodically arranged in the first luminance distribution M1 and the second luminance distribution M2 from left to right. Similarly, the pixels in the first column are sequentially and periodically arranged in the first luminance distribution M1 and the second luminance distribution M2 from top to bottom. In other words, according to the present embodiment, the first luminance distribution M1 and the second luminance distribution M2 of two of the pixels 150 are considered as a unit U, and the distributions of the unit U are periodically changed both in the row direction and in the column direction, respectively. On the other hand, as shown in FIG. 5, the area of the first display region A1 in the first luminance distribution M1 exceeds the area of the first display region A1 in the second luminance distribution M2. However, the areas and the shapes of the first display region A1 and the second display regions A2 are not limited to those provided in the present invention.

Figure 6:
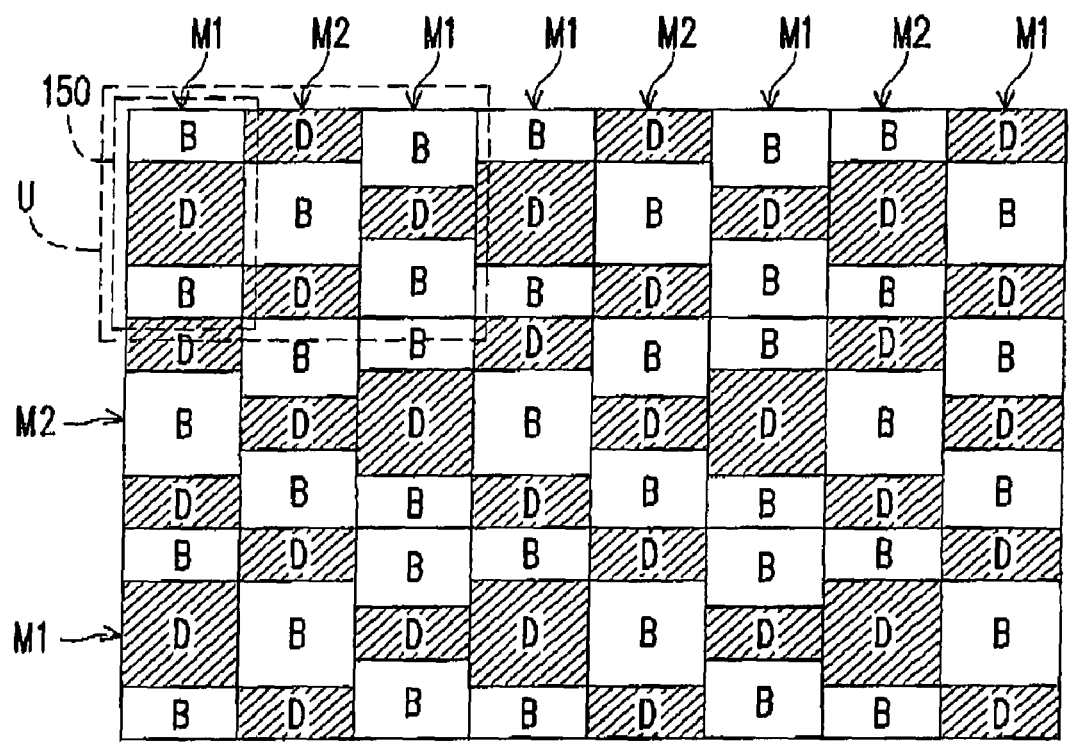
FIG. 6 is a schematic view illustrating a displaying state of still another LCD panel according to the present invention.

FIG. 6 is a schematic view illustrating a displaying state of still another LCD panel according to the present invention. With reference to FIG. 6, the first luminance distribution M1, the second luminance distribution M2 and the first luminance distribution M1 of three of the pixels 150 are considered as a unit U, and the distributions of the unit U are periodically changed both in the row direction and in the column direction, respectively. As illustrated in FIG. 6, in the three pixels 150 which are classified into the same unit U, the areas of two of the first display regions A1 are identical, while another first display region A1 occupies a relatively smaller area. Affirmatively, the areas of each of the first display areas A1 in each pixel can be properly adjusted based on the actual design demands, and the areas and the shapes of the first display regions A1 and the second display regions A2 are not limited to those provided in the present invention.

Figure 7:
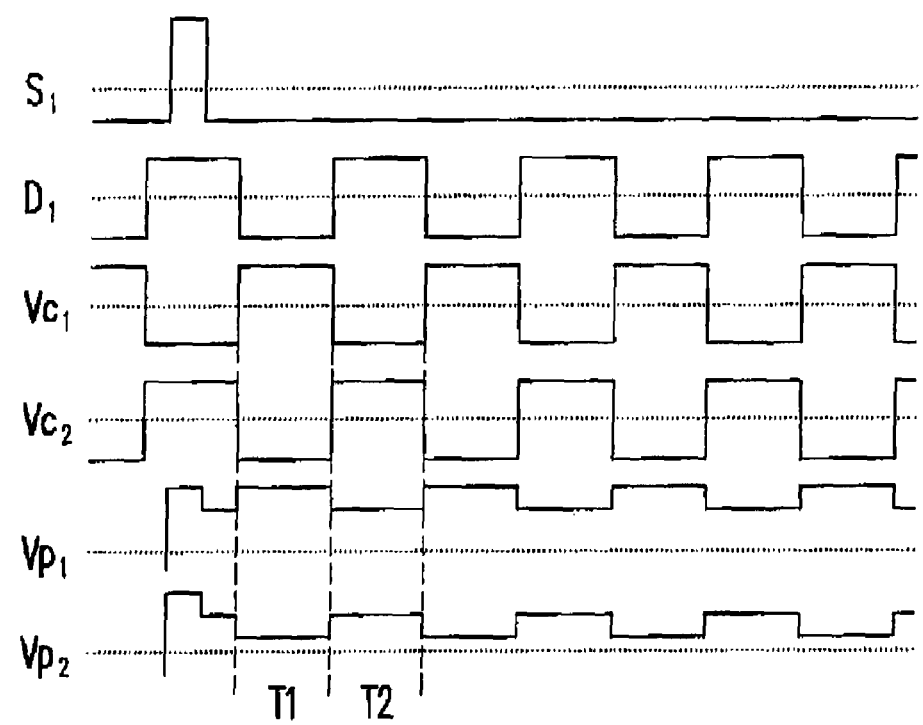
FIG. 7 is a schematic view illustrating a driving waveform of an LCD panel according to the present invention.

FIG. 7 is a schematic view illustrating a driving waveform of an LCD panel according to the present invention. Referring to FIGS. 2 and 7, the driving method of the present invention includes sequentially turning on each of the corresponding scan lines 110 based on scan signals $S_1$ for inputting the data signals $D_1$ from each of the corresponding data lines 120 to each of the pixels 150 in different rows in order. Thereafter, a first alternating signal $Vc_1$ and a second alternating signal $Vc_2$ are provided to the first common line 130 and the second common line 140, respectively. Here, the first alternating signal $Vc_1$ and the second alternating signal $Vc_2$ have substantially the same oscillation periods but have a 180-degree phase shift. Thereby, the first display region A1 and the second display regions A2 of each of the pixels 150 are respectively coupled by the first common line 130 and the second common line 240, and display different levels of brightness. Specifically, during a time frame T1, a display signal $Vp_1$ of the first display region A1 is coupled by the positive first alternating signal $Vc_1$, while a display signal $Vp_2$ of the second display regions A2 is coupled by the reverse second alternating signal $Vc_1$, such that the first display region A1 and the second display regions A2 display different levels of brightness. Likewise, during a time frame T2, the first display region A1 and the second display regions A2 are respectively coupled by the reverse and the positive signals, so as to display different levels of brightness.

It should be noted that the method of inputting the data signals $D_1$ to each of the pixels 150 in the different rows is a dot inversion driving in the present embodiment, for example. In other embodiments, however, the method of inputting the data signals $D_1$ to each of the pixels 150 in the different rows may also be a line inversion driving, a two-line inversion driving, or any other driving types.

Figure 8:
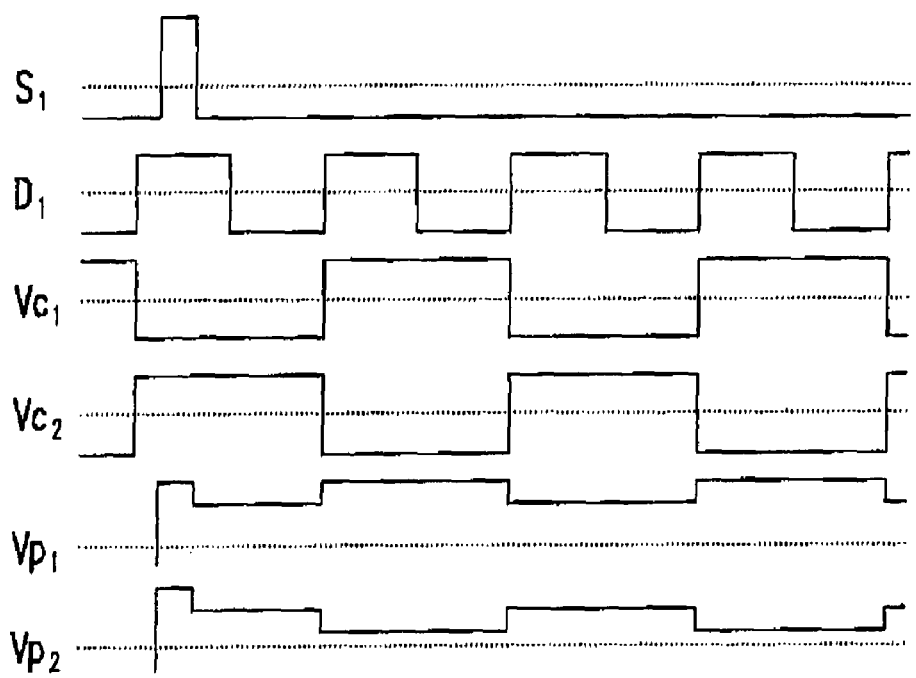
FIG. 8 is a schematic view illustrating a driving waveform of another LCD panel according to the present invention.

FIG. 8 is a schematic view illustrating a driving waveform of another LCD panel according to the present invention. Referring to FIG. 8, the driving method provided by the present embodiment is similar to that provided by the above embodiments, and the difference therebetween lies in that the oscillation periods of the first alternating signal $Vc_1$ and the second alternating signal $Vc_2$ are twice of the oscillation period of the data signal $D_1$. Nevertheless, in other embodiments, the oscillation periods of the first alternating signal $Vc_1$ and the second alternating signal $Vc_2$ may also be integral multiples of the oscillation period of the data signal $D_1$.

Based on the above, each of the pixels in the LCD panel of the present invention is divided into the first display region and the second display regions disposed at the respective sides of the first display region. In addition, with different coupling signals of the different common lines, the different levels of brightness can be displayed, resolving the issue of color shift. Besides, the arrangements and the areas of the first display region and the second display regions in each of the pixels can be adjusted based on the design demands, such that the desired luminance distribution of the LCD panel can be accomplished, and the display quality can be further improved. On the other hand, according to the present invention, the driving method of the LCD panel is capable of adjusting the luminance distribution of the LCD panel to a greater extent, such that the display performance of the LCD panel better satisfies the requirements of the consumers.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the appended claims and their equivalents.

What is claimed is:
1. A liquid crystal display (LCD) panel, comprising:
a plurality of scan lines;
a plurality of data lines;

a plurality of first common lines;

a plurality of second common lines, wherein each of the second common lines is disposed between the two adjacent scan lines;

a plurality of pixels, electrically connected to one of the scan lines and one of the data lines correspondingly, each of the pixels having a first display region and a pair of second display regions when the pixels are driven, wherein the first display region and the pair of the second display regions of each pixel are coupled by one of the first common lines and one of the second common lines, respectively, the first display region and the second display regions of each pixel are aligned in a column direction, and the first display region of each pixel is disposed between the pair of the second display regions of each pixel.

2. The LCD panel as claimed in claim 1, wherein each of the pixels comprises:

a first active device connected to one of the scan lines and one of the data lines correspondingly;

a second active device connected to one of the scan lines and one of the data lines correspondingly;

a first pixel electrode connected to the first active device, wherein the first pixel electrode is located corresponding to the first display region and is disposed over the first common line; and a second pixel electrode connected to the second active device, wherein the second pixel electrode is located corresponding to the second display region and is disposed over the second common line.

3. The LCD panel as claimed in claim 2, wherein the first active device and the second active device of each of the pixels are electrically connected to the same scan line and the same data line.

4. The LCD panel as claimed in claim 2, wherein the second pixel electrode comprises:

a first display electrode electrically connected to the second active device;

a second display electrode, wherein the first pixel electrode is sandwiched between the first display electrode and the second display electrode; and a connecting electrode connecting the second display electrode and the first display electrode.

5. The LCD panel as claimed in claim 4, wherein the connecting electrode in each of the pixels is disposed at one side or at respective sides of the first pixel electrode.

6. The LCD panel as claimed in claim 2, wherein each of the pixels further comprises a first capacitor electrode disposed between the first common line and the first pixel electrode, a first storage capacitor being formed between the first common line and the first capacitor electrode, a second storage capacitor being formed between the first capacitor electrode and the first pixel electrode.

7. The LCD panel as claimed in claim 4, wherein each of the pixels further comprises a first capacitor electrode disposed between the first common line and the first pixel electrode, a first storage capacitor being formed between the first common line and the first capacitor electrode, a second storage capacitor being formed between the first capacitor electrode and the first pixel electrode.

8. The LCD panel as claimed in claim 7, wherein the first capacitor electrode of each of the pixels and a part of the connecting electrode form a coupling capacitor.

9. The LCD panel as claimed in claim 2, wherein each of the pixels further comprises a second capacitor electrode sandwiched between the second common line and the second pixel electrode, and a third storage capacitor is formed between the second common line and the second capacitor electrode.

10. The LCD panel as claimed in claim 2, wherein the first pixel electrode and the second pixel electrode comprise a plurality of slits.

11. The LCD panel as claimed in claim 1, wherein an area of the first display region is substantially equal to an area of the pair of the second display regions in each of the pixels.

12. The LCD panel as claimed in claim 1, wherein the first display region and the pair of the second display regions are rectangular.

13. The LCD panel as claimed in claim 1, wherein each of the pixels has a plurality of luminance distributions, and the luminance distributions are periodically changed both in a row direction and in a column direction.

14. A driving method for driving the LCD panel as claimed in claim 1, comprising:

sequentially turning on each of the scan lines for inputting data signals from each of the data lines to each of the pixels in different rows in order; and providing a first alternating signal and a second alternating signal to the first common line and the second common line, respectively, wherein oscillation periods of the first and the second alternating signals are the same, and the first alternating signal and the second alternating signal have a 180-degree phase shift, such that the first display region and the second display region of each of the pixels respectively are coupled by the first and the second common lines and display different levels of brightness.

15. The driving method as claimed in claim 14, wherein a method of inputting the data signals to each of the pixels in the different rows comprises a dot inversion driving, a line inversion driving, or a two-line invention driving.

16. The driving method as claimed in claim 14, wherein the oscillation periods of the first and the second alternating signals are substantially identical to the oscillation period of the data signal.

17. The driving method as claimed in claim 14, wherein the oscillation periods of the first and the second alternating signals are integral multiples of the oscillation period of the data signal.

* * * * *